United States Patent [19]

Strauss

[11] Patent Number: 4,884,481
[45] Date of Patent: Dec. 5, 1989

[54] RADIALLY ADJUSTABLE TOOL

[75] Inventor: Walter Strauss, Munich, Fed. Rep. of Germany

[73] Assignee: Friedrich Deckel Aktiengesellschaft, Munich, Fed. Rep. of Germany

[21] Appl. No.: 146,833

[22] Filed: Jan. 22, 1988

[51] Int. Cl.[4] .............................................. B23B 41/00
[52] U.S. Cl. .......................................... 82/1.2; 82/1.4
[58] Field of Search ........................... 82/1.2, 1.3, 1.4; 407/37, 45

[56] References Cited

U.S. PATENT DOCUMENTS

| 4,354,305 | 10/1982 | Plummer et al. | |
|---|---|---|---|
| 4,400,118 | 8/1983 | Yamakage et al. | |
| 4,432,258 | 2/1984 | Currer | 82/1.2 |
| 4,451,185 | 5/1984 | Yamakage | |
| 4,489,629 | 12/1984 | D'Andrea et al. | |
| 4,621,548 | 11/1986 | Kubo et al. | |

Primary Examiner—Frederick R. Schmidt
Assistant Examiner—Lawrence Cruz
Attorney, Agent, or Firm—Flynn, Thiel, Boutell & Tanis

[57] ABSTRACT

In a device for facilitating the radial adjustment of a cutting edge member of a boring and turning tool with a rotatable adjusting ring (18) arranged on the outside of a tool-carrier housing, an extendible and retractable locking ram (42) can be extended from the spindle housing (7) of the machine tool, which locking ram in an extended position allows the adjusting ring to be movable to cause a radial adjustment of the cutting edge member and in a retracted position causing the adjusting ring (18) to be fixed with respect to the tool-carrier housing and the machine tool spindle (4) so that no radial adjustment is possible. The device can be automated, since the locking ram (42) can be controlled by a general machine control.

10 Claims, 4 Drawing Sheets

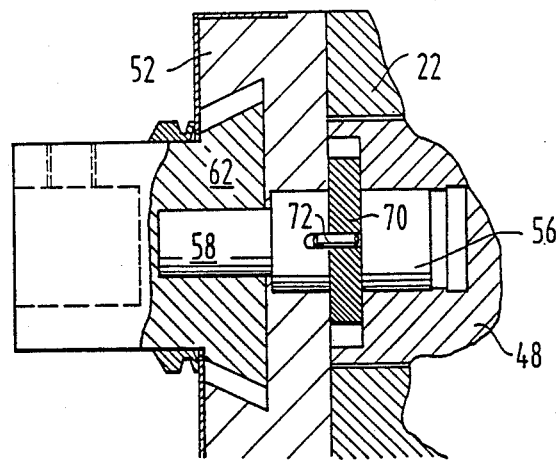
FIG. 2
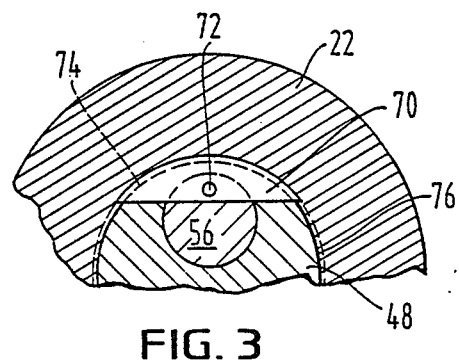
FIG. 3
FIG. 4
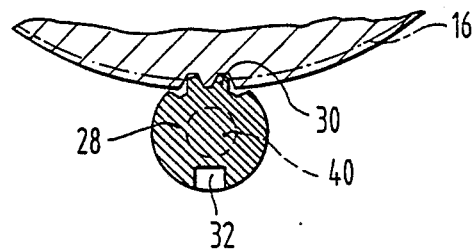

RADIALLY ADJUSTABLE TOOL

FIELD OF THE INVENTION

The invention relates to a device for facilitating a radial adjustment of a cutting edge member of a boring and turning tool.

BACKGROUND OF THE INVENTION

A radial adjustment of a tool cutting edge has basically two different areas of application:

(a) a compensating for the wear of a tool used in the manufacture of internal cylindrical surfaces, with the relatively small radial adjustment of the cutting edge occurring preferably when the tool is disengaged from the workpiece;

(b) a radial adjustment for the purpose of facing, taper turning or similar working processes, with the radial adjustment occurring during an engagement of the tool with the workpiece.

Devices in which the tool edge is adjusted by adjusting for a certain amount an adjusting ring provided with a scale, when the work spindle is at rest are already known. In order to obtain a continuous tool adjustment during the working process, the adjusting ring is connected to a fixed point of the spindle housing through a separate linkage, so that it does not participate in the spindle rotation, such that the cross slide is adjusted in dependency from the spindle rotation through the transmission gear (for example universal facing and boring heads of the Firm Wohlhaupter). A disadvantage of the devices known up to now is that they cannot be integrated into an automatic working sequence, since the adjustment or the coupling of the adjusting ring with the spindle housing must occur manually Also a device in which the adjusting ring can be held by a separate locking mechanism constructed on the machine, so that also an automatic adjustment is possible (EP-A-0 155 241), is already known. The locking mechanism is arranged radially outside of the tool part on which the adjusting ring is arranged The locking mechanism considerably increases the entire space taken up by the tool arrangement and must be taken into consideration, for example, during an examination of a possible collision between the tool and the workpiece A further disadvantage of the known tool arrangement is that when the locking mechanism disengages from the adjusting ring, there is no longer any lock against an unintended adjusting of the adjusting ring. If, for example, the adjusting ring rotating with the entire tool should accidentally for example come into contact with the workpiece, there exists the danger that this radially adjusts the cutting edge.

The purpose of the present invention is to provide a device for facilitating a radial adjustment, which device facilitates an automatic radial adjustment of the tool cutting edge both for the purpose of facing, taper turning or comparable operations, which device has an effective lock against an unintended radial adjustment of the tool edge, and which device has a simple, compact design.

This purpose is inventively attained by providing a locking mechanism which is, in contrast to the construction described in EP-A-0 155 241 which is not arranged stationarily radially outside of the tool, but is constructed as a retractible and extendible locking ram on the spindle housing. The locking ram can during the time which a- radial adjustment is not demanded, be completely retracted, so that it cannot be in this respect a collision obstacle for example with the workpiece. The locking ram lockingly engages in its extended position the adjusting ring, so that the rotary movement of the spindle can then be utilized to carry out the radial adjustment of the tool cutting edge. The locking ram has at the same time the task of operating a locking member, which in a locking position locks the adjusting ring against rotation, however, in an unlocking position releases the adjusting ring.

A further development of the invention supports the locking ram for movement parallel with respect to the direction of the spindle axis. It can thus be arranged substantially within the peripheral contour of the tool, so that this measure contributes to the locking mechanism, even in the extended condition, not creating any collision problems.

The locking member is constructed in a further development of the invention as a bolt movable parallel with respect to the direction of the spindle axis and supported fixed against rotation in a recess of the adjusting ring. The bolt engages, in its locking position by means of a tooth system constructed on its periphery, a tooth system connected to the tool-carrier housing. Depending on the chosen size of the tooth system, a more or less finely tuned radial adjusting and fixing of the cutting edge is possible, as will be described in greater detail later on. Other possibilities of the locking engagement between the locking member and the tool-carrier housing are for example the Hirth-type serrations, the perforated disk and locking bolt or mechanical, hydraulic or other couplings.

One exemplary embodiment of the invention provides a transmission gear having an adjusting thread constructed in the inside of the adjusting ring and arranged coaxially with respect to the direction of the spindle axis. The adjusting thread cooperates with a counterthread provided on an adjusting piston supported for axial movement in the tool-carrier housing, such that upon rotation of the adjusting ring relative to the housing, the adjusting piston is moved, and that an extension inclined with respect to the direction of the spindle axis is arranged at the end of the adjusting piston facing the carriage. The extension is received snugly in a recess constructed on the carriage. Thus, an axial movement of the inclined extension with the adjusting piston results in a forced radial movement of the carriage. This construction is preferably intended for a tool in which a radial adjustment is carried out only for the purpose of compensating for wear, and requires only relatively small radial paths of adjustment.

The transmission gear in another exemplary embodiment of the invention includes a gear drivingly connected to the adjusting ring, which gear cooperates with a rack connected to the carriage. This construction is suited for greater radial paths of adjustment, as they are needed for example during facing, taper turning, etc.

The locking ram is in a further development of the invention connected to a slide drive, which in turn can be controlled and automatically operated by a machine control.

A further development of the invention provides a counter for counting the spindle rotations or spindle angle of rotations. A computer is also provided for converting the spindle rotations which occur into a corresponding radial path of adjustment of the cutting edge. Counter and computer can preferably be integrated into the general machine control.

BRIEF DESCRIPTION OF THE DRAWINGS

Several exemplary embodiments of the invention are illustrated in the drawings and will be described in greater detail hereinafter.

In the drawings:

FIG. 2 is a partial longitudinal cross-sectional view taken along the line II—II of FIG. 1;

FIG. 3 is a partial, cross-sectional view taken along the line III—III of FIG. 1;

FIG. 4 is a partial cross-sectional view taken along the line IV—IV of FIG. 1;

DETAILED DESCRIPTION

Figure 1:
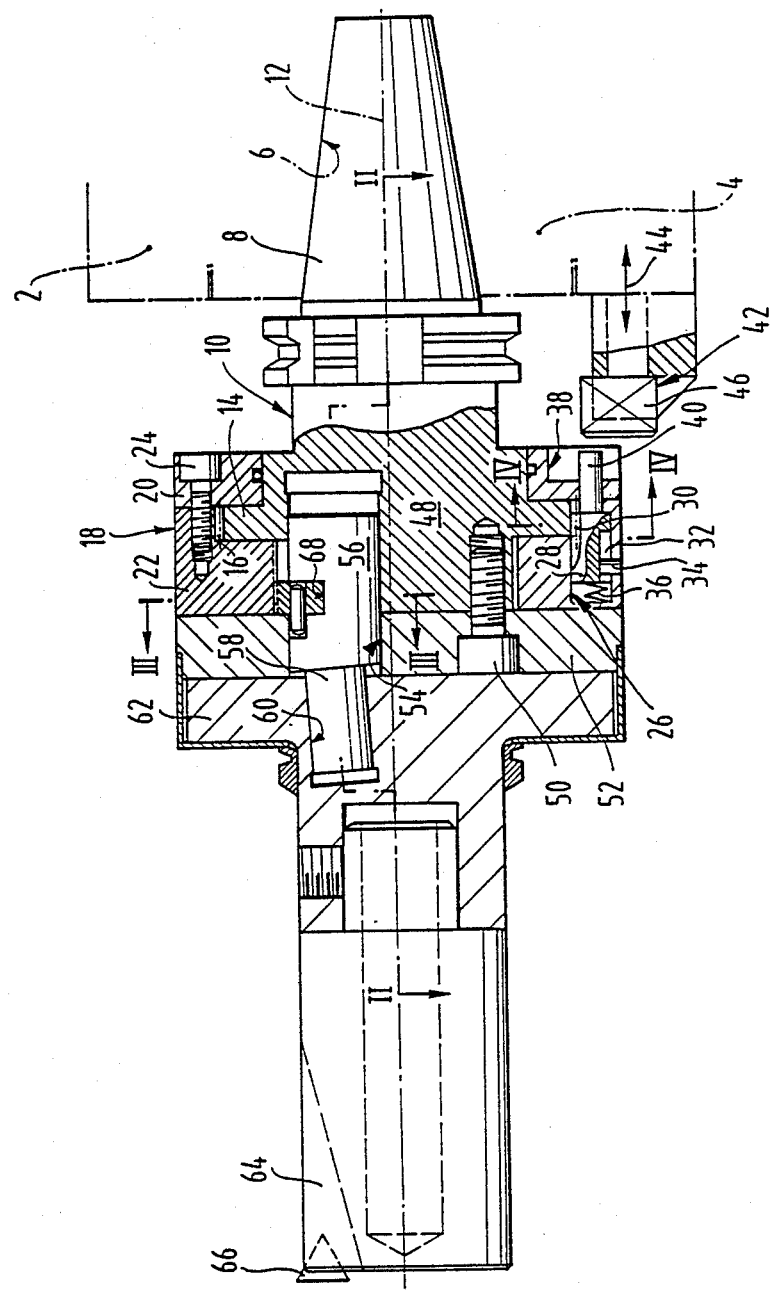
FIG. 1 is a longitudinal cross-sectional view of a device for adjusting the cutting edge of a tool for the purpose of compensating for wear.

The device illustrated in FIG. 1 includes a schematically illustrated spindle 4 rotatably supported in a spindle housing 2 and having a conical tool carrier 6. The taper 8 of a tool-carrier housing 10 is received in and is clamped in a conventional manner, as by a draw bar not illustrated, in the tool carrier 6.

The tool-carrier housing 10 is constructed substantially rotationally symmetrically with respect to the spindle axis 12 and carriers a radially extending flange 14 in its area facing the spindle 4. The flange 14 has a spur gearing 16 on its periphery. An adjusting ring 18, which is coaxial with respect to the spindle axis 12 is supported rotatably on the flange 14. The adjusting ring 18 is composed of a rear adjusting-ring part 20 and a front adjusting-ring part 22, which are connected together by screws 24.

A bolt-shaped locking member 28 is received in a recess 26 of the adjusting ring 18, which member can be moved parallel with respect to the direction of the spindle axis 12. As can in particular also be seen in FIG. 4, the locking member 28 has in its area facing the spindle axis 12 a tooth system 30 which engages the spur gearing 16 of the flange 14. The locking member 28 has a key-seat 32 in the area not facing the tooth system 30, into which key-seat 32 is received a key 34 fastened in the adjusting ring 18. The key 34 prevents a rotation of the locking member 28 about its own longitudinal axis. The locking member 28 can be moved in axial direction between a locking position, in which the tooth system 30 engages the spur gearing 16, and an unlocking position, in which the tooth system 30 is disengaged from the spur gearing 16. A pressure spring 36, which is positioned between the end of the locking member 28, that is, the left end in FIG. 1, and the base of the recess 26 at the other end, presses the locking member 28 into its locking position. The rear adjusting-ring part 20 has in the area in which the locking member 28 is arranged a recess 38. An extension 40 of the locking member 28 projects into the recess 38.

A locking ram 42 is supported for movement in and out of the spindle housing 2 in direction of the arrow 44 parallel to the spindle axis 12. The head 46 of the locking ram 42 is constructed such that it fits snugly into the recess 38.

The tool-carrier housing 10 includes substantially a center part 48, to which a stop plate 52 is secured by means of screws 50. A cylindrical recess 54 is constructed eccentrically with respect to the spindle axis 12 in the center part 48 and the stop plate 52. A suitably formed cylindrical adjusting piston 56 is supported axially movably in the recess 54. The adjusting piston 56 carries at its end, which is the left end in FIG. 1, a cylindrical extension 58 which is inclined between 2 degrees and 6 degrees, preferably approximately 4 degrees with respect to the spindle axis 12. The extension is received in a correspondingly formed recess 60 constructed in a carriage or cross slide 62 supported for movement transversely with respect to the direction of the spindle axis 12 in the stop plate 52. The support for the carriage 62 in the stop plate 52 can be recognized particularly in FIG. 2. The carriage or cross slide 62 carries in a manner which is known and is therefore not described in detail, a boring bar 64 with a cutting edge member 66 which can be moved with the carriage 62 transversely with respect to the spindle axis 12. A circular-segment-shaped guide piece 70 is inserted, preferably glued, into a radial recess 68 of the adjusting piston 56. A pin 72, which is coupled at one end to the guide piece 70 and at the other end to the adjusting piston 56, assures a locking of the guide piece 70 in the recess 68. The guide piece 70 carries on its arch-shaped outer edge a counterthread 74 cooperating with an inner adjusting thread 76 on the inner periphery of the front adjusting-ring part 22. The guide piece 70 and thus the adjusting piston 56 is moved in axial direction during a relative rotation of the adjusting ring 18 with respect to the center part 48. The extent to which the extension 58 extends into the recess 60 of the carriage 62 is thereby controlled. the extension 58 also moves the carriage transversely with respect to the spindle axis 12.

The described device operates as follows: If a wearing of the cutting edge member 66 was measured, the wear is communicated to a central machine control. With the spindle 4 being stationary and angularly aligned, the locking ram 42 is moved out to the left, so that its head 46 extends snugly into the recess 38 of the adjusting ring 18. The locking member 28 is simultaneously moved to the left against the force of the spring 36 until the tooth system 30 disengages from the spur gearing 16 of the flange 14. The spindle 4 is then rotated such that, due to the cooperation of the worn threads 74, 76, the adjusting piston 56 is moved axially and causes the carriage 62 to be moved radially. The control has a counter for counting the spindle rotations and for converting these into the radial increments of the carriage 62.

Figure 5:
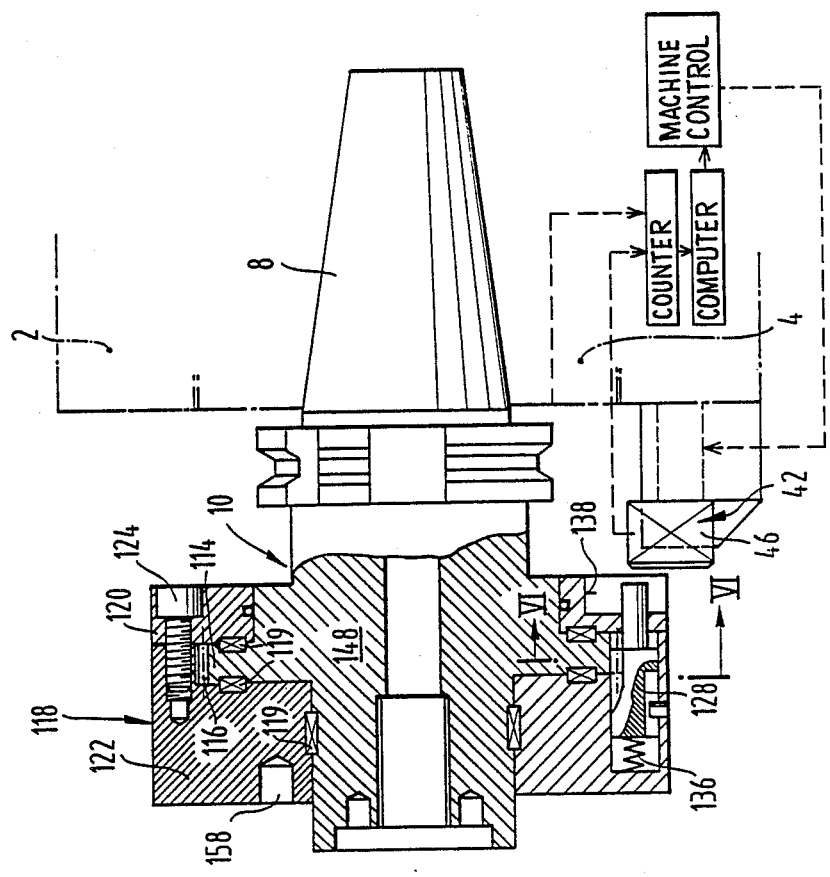
FIG. 5 is a longitudinal cross-sectional view approximately corresponding with FIG. 1, however, of a different exemplary embodiment.
Figure 6:
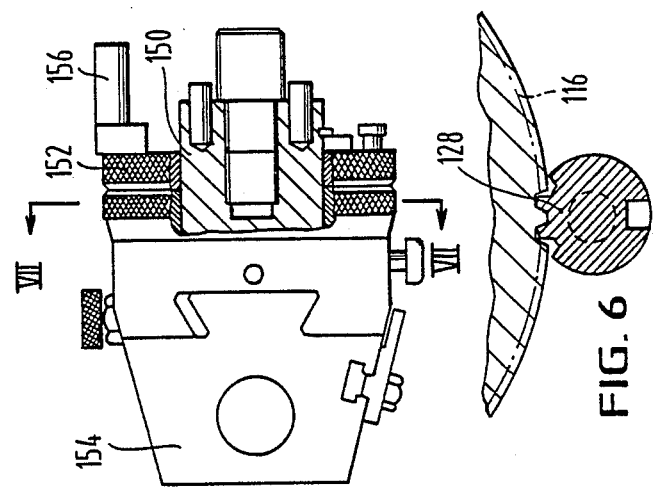
FIG. 6 is a partial cross-sectional view taken along the line VI—VI of FIG. 5.

FIG. 5 illustrates a different exemplary embodiment of the invention. The parts which correspond with parts of FIGS. 1 to 4 have the same reference numerals.

The tool-carrier housing 10 includes again a center part 148 with a flange 114, a spur gearing 116 being constructed on the outer periphery of the flange. An adjusting ring 118 is supported rotatably through bearings 119 on the center part 148. The adjusting ring 118 again consists of a rear adjusting-ring part 120 and a front adjusting-ring part 122, both of which are secured to one another by screws 124. The adjusting ring 118 is provided, in the same manner as described in FIG. 1, with a locking member 128 which can be operated by a locking ram 42 drivable out of the spindle housing 2 and the head 46 of which extends snugly into a recess 138 of the rear adjusting-ring part 120. The adjusting ring 118 can in this manner again be locked against rotation, while the spindle 4 and thus the center part 148 rotate.

Figure 7:
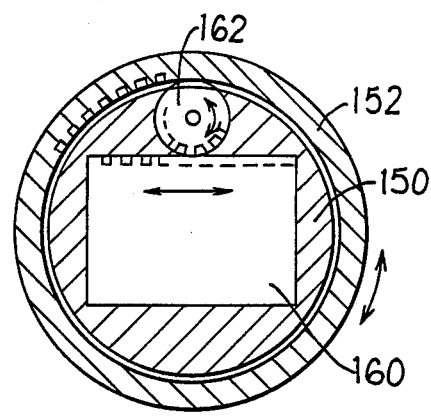

A common universal facing and boring head is secured on the front side of the center part 148. The actual housing 150 of which head is fixedly connected against rotation to the center part 148. An adjusting ring 152, which is supported rotatably on the housing 150 and which effects a radial adjusting of the carriage or cross slide 154 through a gearing shown in FIG. 7, is fixedly coupled against rotation through a coupling piece 156 which extends into a corresponding recess 158 on the front adjusting-ring part 122. As shown in FIGS. 5 and 7, the adjusting ring 152 is drivingly connected to a pinion gear 162, which cooperates with a rack 160 to radially adjust the carriage or cross slide 154.

This device operates as follows: If the carriage or cross slide 154, for accomplishing a face working or a taper working, is adjusted radially in response to a rotation of the spindle, the locking ram 42 is, during a stationary spindle 4, extended to the left, so that its head 46 extends into the recess 138 of the adjusting ring 118 and moves thereby in the already described manner the locking member 128 to the left into its unlocking position. When the spindle 4 rotates, the adjusting ring 118 and through the recess 158 and the coupling piece 156 also the adjusting ring 152 are held in position. The center part 148 takes along the housing 150 fixedly connected against rotation to the center part, so that the carriage or cross slide 154 is adjusted radially by the cooperation of the pinion gear 162 and the rack 160 which is arranged within the housing 150.

The adjusting path is determined by the spindle rotations being counted (FIG. 5) by a counter and being converted by a computer into a corresponding radial adjusting path of the carriage 154. This device also facilitates an incorporation into a fully automatic machine control.

The embodiments of the invention in which an exclusive property or privilege is claimed are defined as follows:

1. A device for effecting a radial adjusting of a cutting edge member of a boring and turning tool, comprising: a tool-carrier housing insertable into a spindle rotatably supported in a spindle housing of a machine tool, a cross slide carrying said cutting edge member and being supported for movement on said tool-carrier housing transversely with respect to the direction of a spindle axis an adjusting ring supported rotatably on the outside of said tool-carrier housing and coaxially with respect to the direction of said spindle axis, which adjusting ring is coupled with said cross slide through a transmission gear arranged in said tool-carrier housing, locking means for locking said adjusting ring relative to said tool-carrier housing which rotates with said spindle, said locking means including an extendable and retractable locking ram on said spindle housing, said locking ram, in its extended position, being lockingly engagable with said adjusting ring, and a locking member arranged on said adjusting ring, said locking member being adjustable between a locking position locking said adjusting ring to said tool-carrier housing and an unlocking position releasing said adjusting ring, a restoring means for continually urging said locking means toward said locking position, said locking ram operatively engaging said locking member, such that said locking member is, during an extending of said locking ram, movable by said locking ram against the force of said restoring means into its unlocking position.

2. The device according to claim 1, wherein said adjusting ring has a recess designated for a snugly receiving said locking ram therein.

3. The device according to claim 1, wherein said locking ram is extendible parallel with respect to the direction of said spindle axis.

4. The device according to claim 1, wherein said locking member is constructed as a bolt supported for movement parallel with respect to the direction of said spindle axis and supported fixedly against rotation in a recess of said adjusting ring, which bolt in its locking position engages by means of a tooth system constructed on its periphery a tooth system connected to said tool-carrier housing.

5. In a device for effecting a radial adjusting a cutting edge member of a boring and turning tool, said device including a tool-carrier housing insertable into a spindle rotatably supported in a spindle housing of a machine tool, a cross slide carrying said cutting edge member and being supported for movement transversely with respect to the direction of a spindle axis on said tool-carrier housing, an adjusting ring supported rotatably coaxially with respect to the direction of said spindle axis on the outside of said tool-carrier housing, which adjusting ring is coupled with said cross slide through a transmission gear arranged in said tool-carrier housing, and a locking device for locking said adjusting ring relative to said tool-carrier housing which rotates with said spindle, the improvement wherein said locking device includes an extendable and retractable locking ram on said spindle housing receiving said spindle, which locking ram, in its extended position lockingly engages said adjusting ring, wherein a locking member, which can be adjusted between a locking position locking said adjusting ring to said tool-carrier housing and an unlocking position releasing said adjusting ring, is arranged on said adjusting ring, which locking member becomes operatively engaged by said locking ram such that said locking member, during an extending of said locking ram, can be adjusted against the force of a restoring means into its unlocking position, wherein said transmission gear includes an adjusting thread constructed on the inside of said adjusting ring and arranged coaxially with respect to the direction of said spindle axis, which adjusting thread cooperates with a counterthread constructed on an adjusting piston supported for axial movement in said tool-carrier housing, wherein during rotation of said adjusting ring relative to said tool-carrier housing, said adjusting piston is moved, and wherein an extension inclined with respect to the direction of said spindle axis is arranged at an end of said adjusting piston facing said cross slide, which extension is snugly received in a recess constructed in said cross slide.

6. The device according to claim 5, wherein the angle of inclination between the direction of said spindle axis and the alignment of said extension is between 2 degrees and 6 degrees, preferably approximately 4 degrees.

7. The device according to claim 1, wherein said transmission gear includes a gear drivingly connected to said adjusting ring, which gear cooperates with a rack connected to said cross slide.

8. The device according to claim 1, wherein said locking ram is connected to a slide drive, said slide drive supporting said locking ram for movement into and out of said spindle housing.

9. The device according to claim 8, wherein said slide drive of said locking ram is connected to a machine control and can be operated automatically.

10. The device according to claim 1, wherein a counter is provided for counting of the spindle rotating carried out with the locking ram extended and a computer for converting the carried-out spindle rotations into the corresponding radial path of adjustment of said cutting edge member.

* * * * *

UNITED STATES PATENT AND TRADEMARK OFFICE
CERTIFICATE OF CORRECTION

PATENT NO.   : 4,884,481
DATED        : December 5, 1989
INVENTOR(S)  : Walter STRAUSS It is certified that error appears in the above-identified patent and that said Letters Patent is hereby corrected as shown below:

```
Column 5, line 47; after "axis" insert ---,---.
Column 5, line 63; change "locking means" to
                   ---locking member---.
Column 5, line 65; delete ",".
Column 6, line  2; delete "a" (second occurrence).
Column 6, line 15; after "adjusting" insert ---of---.
Column 7, line  5; change "rotating" to ---rotations---.
```

Signed and Sealed this

Twelfth Day of February, 1991

*Attest:*

HARRY F. MANBECK, JR.

*Attesting Officer*   *Commissioner of Patents and Trademarks*